(12) United States Patent
Lee et al.

(10) Patent No.: US 7,353,819 B2
(45) Date of Patent: Apr. 8, 2008

(54) PROCESSING TIPS AND TOOLS USING THE SAME

(75) Inventors: Dong Soo Lee, Seoul (KR); Young Se Yoon, Incheon (KR); Yong Ki Shim, Incheon (KR)

(73) Assignee: Dong Young Diamond Industrial Co., Ltd., Incheon (KR)

( * ) Notice: Subject to any disclaimer, the term of this patent is extended or adjusted under 35 U.S.C. 154(b) by 0 days.

(21) Appl. No.: 11/600,158

(22) Filed: Nov. 16, 2006

(65) Prior Publication Data

US 2007/0144510 A1  Jun. 28, 2007

(30) Foreign Application Priority Data

Dec. 23, 2005 (KR) .................. 10-2005-0128337
Mar. 17, 2006 (KR) .................. 10-2006-0025060

(51) Int. Cl.
*B28D 1/12* (2006.01)
*B23F 21/03* (2006.01)

(52) U.S. Cl. .................. 125/22; 451/542; 451/546

(58) Field of Classification Search .................. 125/15, 125/22; 451/541, 542, 543, 546, 548
See application file for complete search history.

(56) References Cited

U.S. PATENT DOCUMENTS 3,072,470 A * 1/1963 Hinshaw .................. 51/293
4,484,560 A * 11/1984 Tanigawa .................. 125/15
5,433,187 A    7/1995 Hayasaka et al.
6,250,295 B1 * 6/2001 Chanton et al. .............. 125/15
6,638,153 B2 * 10/2003 Lee et al. .................. 451/547
6,752,709 B1 * 6/2004 Skibo et al. ................ 451/547
7,131,903 B2   11/2006 Galen et al.
2006/0130823 A1 * 6/2006 Kim et al. .................. 125/15

FOREIGN PATENT DOCUMENTS

| JP | 07-148729 | 6/1995 |
| JP | 07-156069 | 6/1995 |
| JP | 08-090425 | 4/1996 |
| JP | 2001-038718 | 2/2001 |
| KR | 10-2000-0010841 | 2/2000 |
| KR | 10-2002-0068171 | 8/2002 |
| KR | 20-0306715 | 3/2003 |
| KR | 10-2003-0062464 | 7/2003 |
| KR | 20-0321732 | 7/2003 |
| KR | 10-2003-0067394 | 8/2003 |
| KR | 10-0466510 | 1/2005 |
| KR | 10-2005-0040910 | 5/2005 |
| KR | 10-0506162 | 8/2005 |
| WO | WO 02/066217 A1 | 8/2002 |

* cited by examiner

Primary Examiner—Dung Van Nguyen

(57) ABSTRACT

A processing tip and a cutting tool employing the same, including a tip body of a mixture of metal and abrasive material, and at least one projection coupled to the tip body, the projection extending in a direction perpendicular to a direction of a plane of contact between the tip body and a shank.

20 Claims, 5 Drawing Sheets

PROCESSING TIPS AND TOOLS USING THE SAME

BACKGROUND OF THE INVENTION

1. Field of the Invention

The present invention relates to processing tips of cutting tools. In particular, the present invention relates to processing tips and a method of attaching the same to a cutting tool providing improved structure durability.

2. Discussion of the Related Art

In general, diamonds may have very high hardness values, and, therefore, they may be employed in cutting tools to facilitate cutting of various materials. In particular, diamonds may be integrated into processing tips of cutting tools as hardness reinforcing components in addition to other materials, such as metal, for the purpose of cutting hard materials, such as granite, marble, brick, firebrick, concrete, asphalt, glass, and so forth.

Processing tips of a cutting tool may be attached to a circumference thereof, such that the processing tips may cut through a material, i.e., a workpiece, upon contact therewith during rotation of the cutting tool. For example, the processing tips may be affixed to the circumference of a rotating disc, plate, or cylindrical pipe of a cutting tool, i.e., a shank, such as a saw blade, a gang saw, a chain saw, a frame saw, a core drill, a processing cup wheel, a polishing disc, and so forth.

The processing tips may be attached to such cutting tools by methods such as fusion, electro-deposition, co-heating, and welding. The fusion, electro-deposition, and co-heating methods may be complicated and may not be applicable to large-size tools. The welding method may be more widely employed than the other methods due to its ease of performance and wide applicability. However, the welding method may produce excessive shearing stress on the contact line and/or plane between the processing tip and the shank of the cutting tool. Such stress may minimize the ability of the processing tip to withstand the mechanical and physical impacts during cutting and, thereby, cause breakage of the processing tips. Additionally, the welding method may weaken the hardness properties of the shank of a cutting tool and, thereby, advance deterioration thereof due to grinding forces between the workpiece and the shank.

Accordingly, there remains a need for processing tips and a method of attaching thereof to a shank of a cutting tool providing reduced breakage of the processing tips and minimized deterioration of the shank.

SUMMARY OF THE INVENTION

The present invention is therefore directed to processing tips and a method of attaching the same to a cutting tool, which substantially overcome one or more of the problems due to the limitations and disadvantages of the related art.

It is therefore a feature of an embodiment of the present invention to provide processing tips having a structure capable of improving attachment thereof to a cutting tool.

It is another feature of an embodiment of the present invention to provide a cutting tool having processing tips provided with a structure capable of minimizing deterioration of a shank thereof.

It is yet another feature of an embodiment of the present invention to provide a method of attaching processing tips to a cutting tool capable of providing enhanced durability.

At least one of the above and other features and advantages of the present invention may be realized by providing a processing tip of a cutting tool, having a tip body including a mixture of metal and abrasive material, and at least one projection coupled to the tip body, the at least one projection extending in a direction perpendicular to a direction of a plane of contact between the tip body and a shank.

The projection may include a mixture of metal and abrasive material. The abrasive material may include particles of diamonds, silica carbide, tungsten carbide, boron nitride, aluminum oxide, or a mixture thereof. The metal may include cobalt (Co), copper (Cu), tin (Sn), iron (Fe), zinc (Zn), nickel (Ni), or a mixture thereof.

The projection may be coupled to a center of a lower surface of the tip body. Alternatively, the projection may be coupled to a front end of a lower surface of the tip body. The projection may also be circular.

The tip body may include at least one incising groove. The incising groove may communicate with an upper surface of the tip body. Alternatively, the incising groove may communicate with a lower surface of the tip body.

The processing tip of the present invention may include a metal member. The metal member may be formed at a front end of the processing tip.

In another aspect of the present invention, there is provided a cutting tool, having a shank with a plurality of grooves, a plurality of tip bodies including a mixture of metal and abrasive material, and a plurality of projections, wherein each projection may be coupled to one tip body and positioned in one groove. The shank may be a disc, a plate, or a tube.

In yet another aspect of the present invention, there is provided a method of preparing a cutting tool, including mixing metal and abrasive material to form a first mixture, mixing metal and abrasive material to form a second mixture, injecting the first mixture into a first mold to form at least one tip body, injecting the second mixture into a second mold to form at least one projection, welding the tip body and the projection to form a processing tip, and welding the processing tip into a groove of a shank.

The welding may include high frequency welding, laser welding, or oxygen torch welding. The welding of the tip body and the projection may include attaching the projection to a front end of the tip body. The welding of the processing tip into a groove of a shank may include attaching a metal member to a front end of the processing tip. Additionally, mixing of the second mixture may include employing a higher concentration of abrasive material relative to the first mixture.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
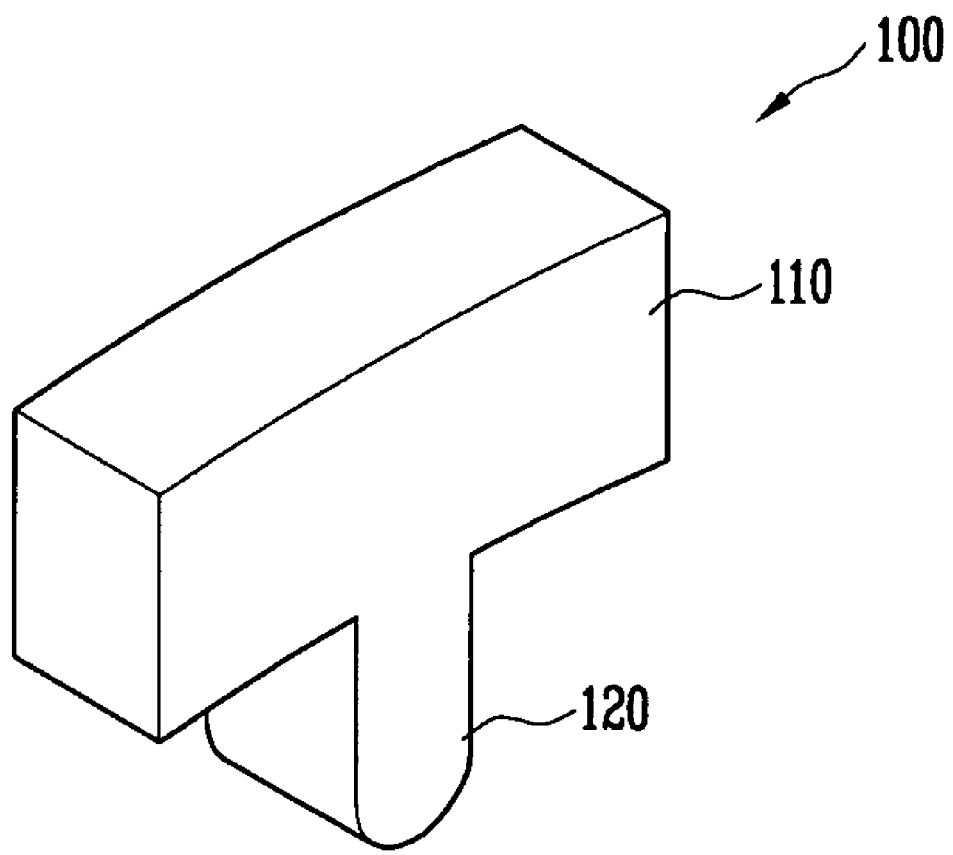
FIG. 1 illustrates a perspective view of a processing tip according to an embodiment of the present invention.

Korean Patent Application Nos. 10-2005-0128337 and 10-2006-0025060, filed on Dec. 23, 2005 and Mar. 17, 2006, respectively, in the Korean Intellectual Property Office, and entitled: "Processing Tip and Tools Using the Same," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer, element, or substrate, or intervening layers or elements may also be present. Further, it will be understood that when a layer or element is referred to as being "under" another layer or element, it can be directly under, or one or more intervening layers or elements may also be present. In addition, it will also be understood that when a layer or element is referred to as being "between" two layers or elements, it can be the only layer or element between the two layers or elements, or one or more intervening layers or elements may also be present. Like reference numerals refer to like elements throughout.

An exemplary embodiment of a processing tip according to an embodiment of the present invention is more fully described below with reference to FIGS. 1-2B.

As illustrated in FIG. 1, a processing tip 100 according to an embodiment of the present invention may include a tip body 110 and a projection 120.

The tip body 110 of the processing tip 100 according to an embodiment of the present invention is the part that may form a physical contact with a workpiece for the purpose of cutting it. The tip body 110 may be formed in any shape known in the art, e.g., hexahedron, at a predetermined height, while the height and shape of the tip body 110 may depend on the type of materials used for forming thereof and its intended use.

The tip body 110 may be formed of a metal composition having abrasive materials integrated therein in order to enhance the hardness of the processing tip 100. In this respect, it should be noted that "hardness," "hardness properties," and like terminology with respect to the present invention refers to material property as determined with respect to Brinell Hardness Scale according to an EN ISO 6506-1 test or an ASTM E10 test, or as determined with respect to Rockwell Hardness Scale according to an ISO 6508-1 test or an ASTM E18 test. In this respect, it should also be noted that increased amounts or concentrations of abrasive material in any parts of the processing tip 100 of the present invention may indicate increased hardness.

Preferred metals may include, but are not limited to, cobalt (Co), copper (Cu), tin (Sn), iron (Fe), zinc (Zn), nickel (Ni), and so forth. Preferred abrasive materials may include, but are not limited to, diamond, silicon carbide (SiC), tungsten carbide (WC), boron nitride (BN), aluminum oxide ($Al_2O_3$), and so forth.

The projection 120 of the processing tip 100 according to an embodiment of the present invention may be coupled with the tip body 110, such that it may be projected towards a shank of a cutting tool. In particular, the projection 120 may be interposed into a groove (not shown) of a shank 200 of a cutting tool to facilitate bonding thereof. Without intending to be bound by theory, it is believed that such bonding may minimize separation, e.g., breakage, between the tip body 110 and the cutting tool after being bonded. The width of the projection 120 may be equal to or smaller than the width of the tip body 110.

The projection 120 may be formed of the same materials as the tip body 110. In particular, the projection 120 may be formed of a metal composition having abrasive materials integrated therein. Preferred metals may include, but are not limited to, cobalt (Co), copper (Cu), tin (Sn), iron (Fe), zinc (Zn), nickel (Ni), and so forth. Preferred abrasive materials may include, but are not limited to, diamond, silicon carbide (SiC), tungsten carbide (WC), boron nitride (BN), aluminum oxide ($Al_2O_3$), and so forth. The proportions of the metal and abrasive material in the projection 120 may be the same or different as compared to the proportions of metal and abrasive materials employed in the tip body 110.

Without intending to be bound by theory, it is believed that increasing the concentration of abrasive materials in the projection 120, i.e., reinforcing the projection 120, may minimize abrasion of the shank 200 upon contact with the workpiece. In particular, when the reinforced projection 120 is interposed into the groove of the shank 200 for the purpose of bonding, the projection 120 may impart hardness properties to the medium immediately surrounding it, i.e., the groove of the shank 200. Accordingly, portions of the shank 200 immediately surrounding the reinforced projection 120 may become indirectly reinforced as well, thereby showing minimized abrasion, as will be further illustrated in FIG. 2A.

Figure 2A:
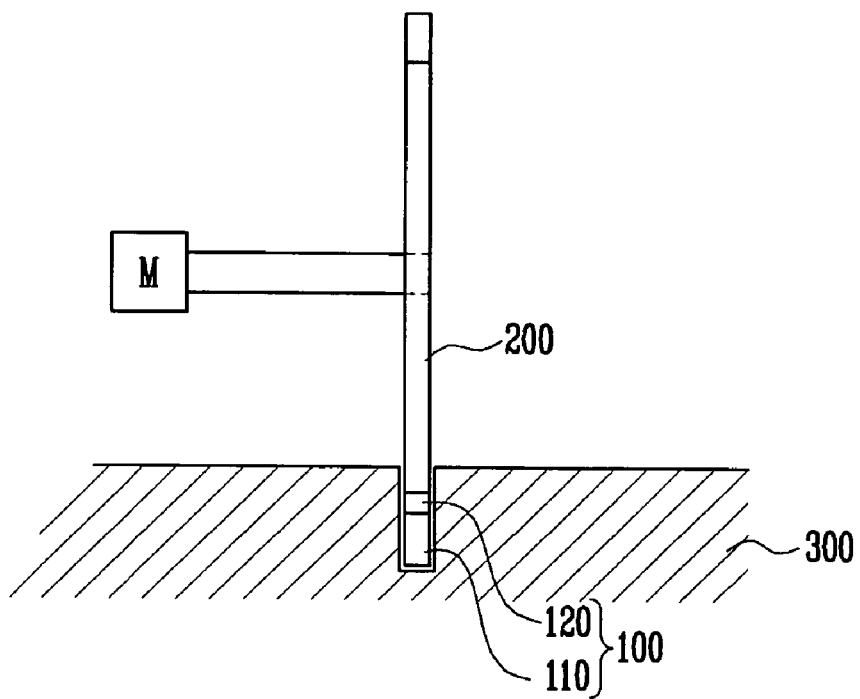
FIG. 2A illustrates a cross-sectional view of a saw-type cutting tool having the processing tip illustrated in FIG. 1, with respect to a workpiece.

As illustrated in FIG. 2A, a cutting tool, e.g., a saw, may include a shank 200, e.g., a disc, and the processing tip 100 may be mounted thereon via bonding between the projection 120 and the shank 200. During cutting, the shank 200 may rotate and, thereby, insert the processing tip 100 into a workpiece 300. As further illustrated in FIG. 2A, when the cut into the workpiece 300 is deep, parts of the shank 200 may be in contact with the workpiece 300. As previously discussed with respect to the structure of the projection 120, the reinforced composition of the projection 120 may impart additional hardness to the shank 200 directly surrounding it and, thereby, minimize its abrasion. Similarly, the reinforced projection 120 may impart additional hardness to the shank 400 of a drill-type cutting tool, as illustrated in FIG. 2B.

In this respect, it should be noted that the processing tip 100 according to an embodiment of the present invention may be integrated into any type of cutting tool having a shank, e.g., disc, plate, tube, and so forth. Accordingly, even though the following embodiments will be described with respect to a cutting tool having a disc type shank, drill-type cutting tools having a tube shank, for example, are not excluded form the scope of the present invention.

Figure 2B:
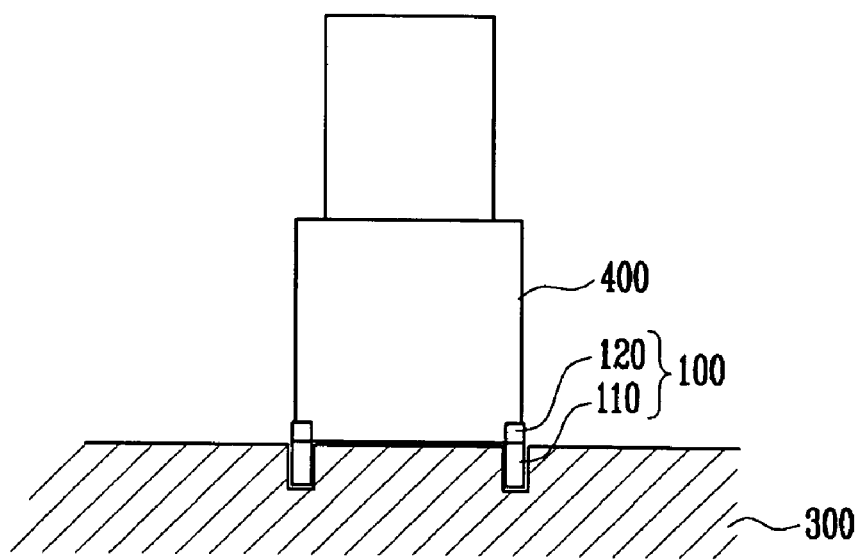
FIG. 2B illustrates a cross-sectional view of a drill-type cutting tool having the processing tip in FIG. 1, with respect to a workpiece.
Figure 3:
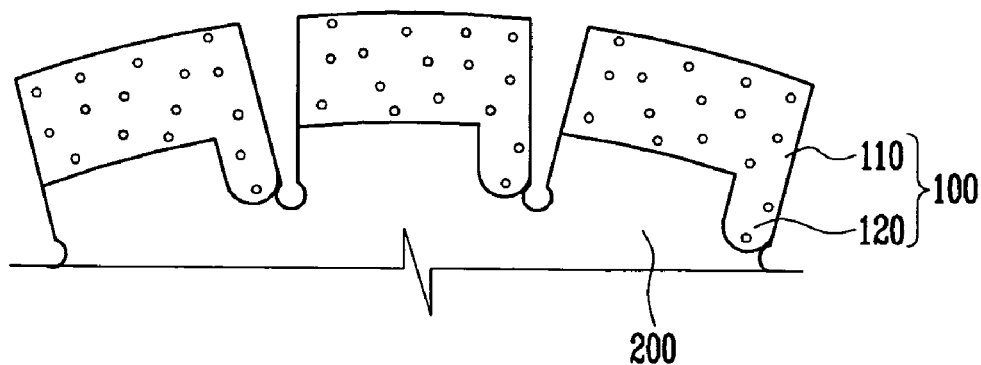
FIG. 3 illustrates a front view of a processing tip according to another embodiment of the present invention.

The projection 120 may be formed at a center of the processing tip 100 as previously discussed with respect to FIGS. 1-2B. Alternatively, the projection 120 may be formed at a front end of the processing tip 100, as illustrated in FIG. 3. Without intending to be bound by theory, it is believed that forming the projection 120 at the front end of the processing tip 100 may minimize potential weakness of the processing tip 100 and shank 200 and, thereby, minimize potential abrasion of the shank 200 and potential separation between the processing tip 100 and the shank 200 along the contact line therebetween.

Figure 4:
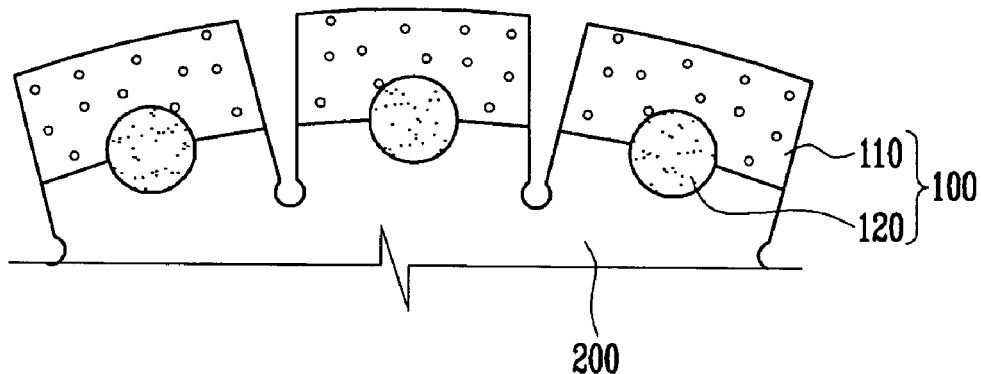
FIG. 4 illustrates a front view of a processing tip according to another embodiment of the present invention.

Alternatively, as illustrated in FIG. 4, a projection 120 may be formed to have a circular shape, as opposed to a longitudinal shape discussed in FIGS. 1-3. In this regard, it should be noted that other shapes, e.g., triangular, are not excluded from the scope of the present invention.

Additionally, as further illustrated in FIG. 4, the projection 120 may be formed of a material composition different than the material composition of the tip body 110. For example, the projection 120 may have a higher concentration of abrasive materials as compared to the tip body 110 in order to provide reinforced attachment between the tip body 110 and the shank 200. Alternatively, the projection 120 may have a lower concentration of abrasive materials as compared to the tip body 110.

Figure 5:
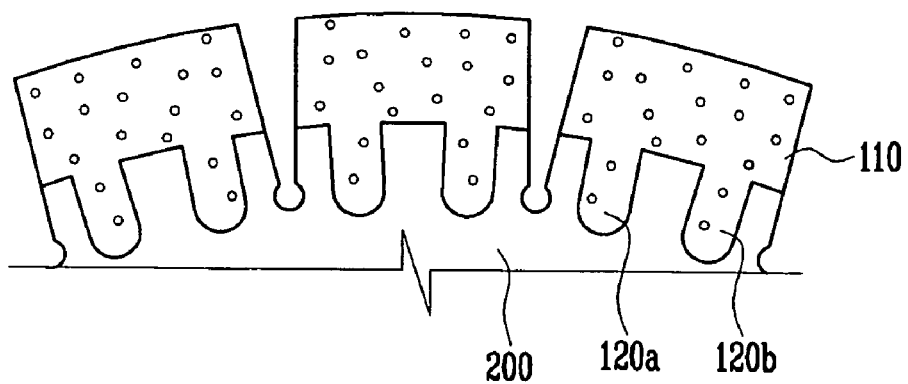
FIG. 5 illustrates a front view of a processing tip according to another embodiment of the present invention.

The processing tip 100 of the present invention may also include a plurality of projections 120. For example, as illustrated in FIG. 5, the processing tip 100 may include a first projection 120a and a second projection 120b.

Figure 6:
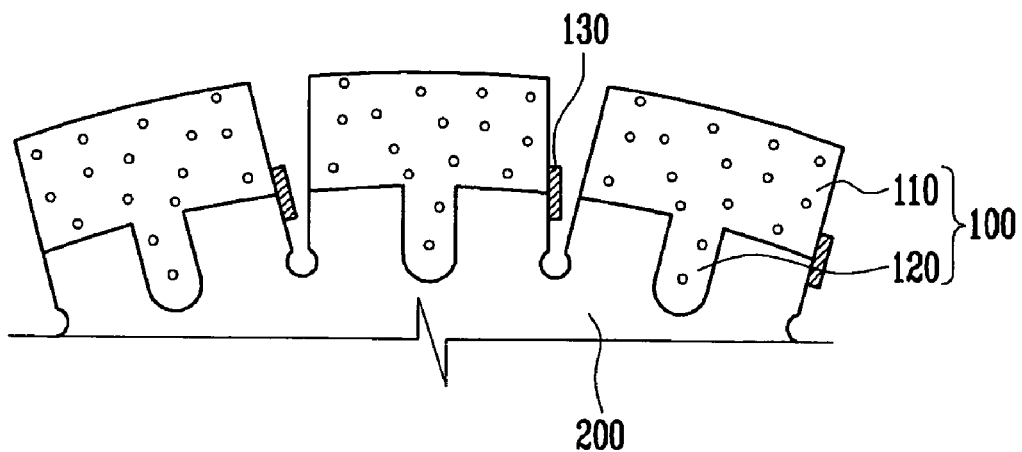
FIG. 6 illustrates a front view of a processing tip according to another embodiment of the present invention.

As illustrated in FIG. 6, the processing tip 100 of the present invention may additionally include a metal member 130. The metal member 130 may be formed to have a longitudinal shape, and it may be affixed to a front end of the processing tip 100, i.e., an end that may have a first contact with a workpiece during cutting. In particular, the metal member 130 may be affixed to the front end of the processing tip 100, such that the metal member 130 may be in direct contact with a contact line between the tip body 110 and the shank 200. Without intending to be bound by theory, it is believed that affixing the metal member 130 to the processing tip 100 may minimize potential weakness of the processing tip 100 and shank 200, and, thereby, minimize potential abrasion of the shank 200 and potential separation between the processing tip 100 and the shank 200 along the contact line therebetween.

Figure 7A:
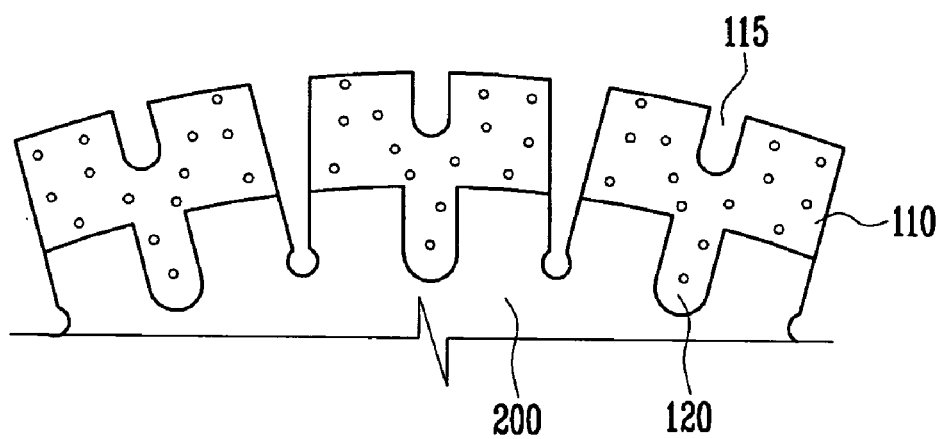
FIGS. 7A-7C illustrate front views of a processing tip according to other embodiments of the present invention.
Figure 7B:
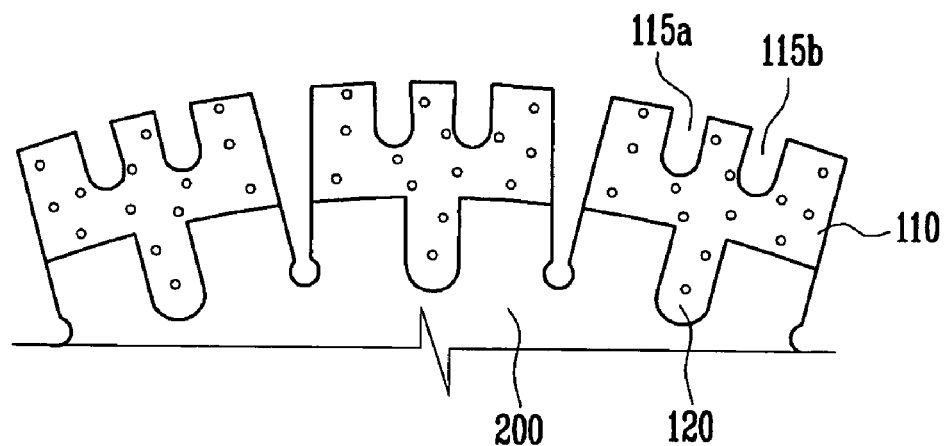
Figure 7C:
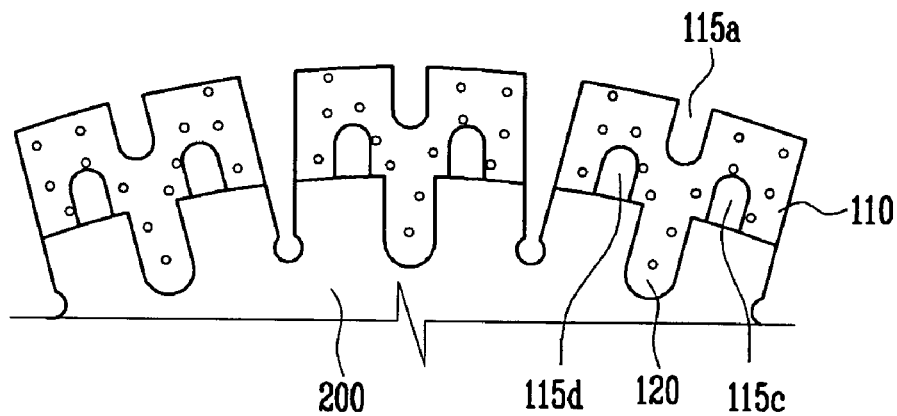

Further, the processing tip 100 of the present invention may include at least one incising groove 115, as illustrated in FIGS. 7A-7C. The incising groove 115 may be formed in any form known in the art in a direction perpendicular to a direction of motion of the shank 200, i.e., the incising groove 115 may be formed to have a depth in a direction parallel to a contact plane between the tip body 110 and the shank 200, and it may be formed to have a length equal to the width of the tip body 110. When a plurality of incising grooves 115 is formed, as illustrated in FIG. 7B, the tip body 110 may include a first incising groove 115a and a second incising groove 115b.

In this respect, it should be noted that the plurality of incising grooves 115 may be formed at any position with respect to the projection 120. For example, as illustrated in FIG. 7C, the plurality of incising grooves 115 may be formed to communicate both with the shank 200 and the workpiece. For example, as further illustrated in FIG. 7C, at least one incising groove 115 may communicate with an upper portion of the tip body 110, such that it is in communication with the workpiece. Simultaneously, at least one incising groove 115 may communicate with a lower portion of the tip body 110, such that it is in communication with the shank 200.

Without intending to be bound by theory, it is believed that formation of at least one incising groove 115 may facilitate circulation of cooling materials during cutting, thereby providing removal of chips produced during processing. Additionally, formation of at least one incising groove 115 in communication with the shank 200 may facilitate material circulation and chip removal even when the processing tip 100 is deteriorated, due to the positioning of the incising groove 115.

Figure 8:
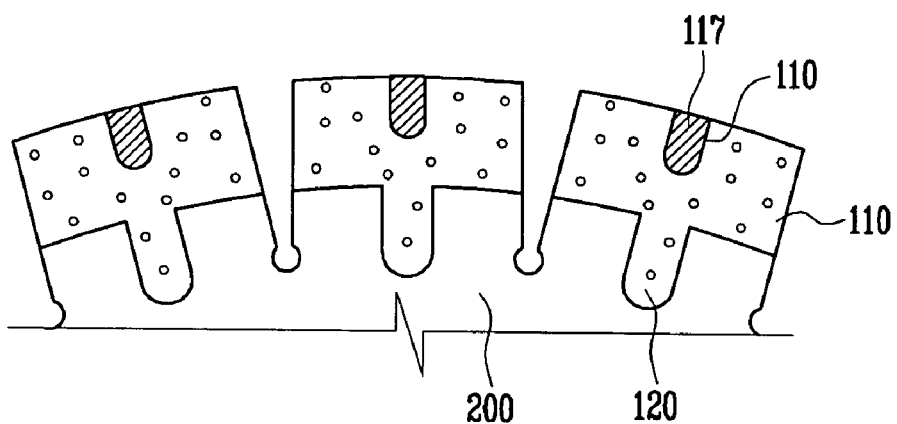
FIG. 8 illustrates a front view of a processing tip according to another embodiment of the present invention.

The processing tip 100 of the present invention may also include a channel 117 therein to provide buffering effect and enhance smooth cutting and speed, while minimizing noise. As illustrated in FIG. 8, the channel 117 may be formed in the tip body 110, and it may be filled with a filler composition having an abrasive material concentration that is lower than the concentration of the abrasive material contained in the tip body 110, i.e., the filler composition may exhibit lower hardness properties as compared to the tip body 110. The filler composition may include colored metal powder, such as copper (Cu) and tin (Sn), to provide visual distinction.

Figure 9:
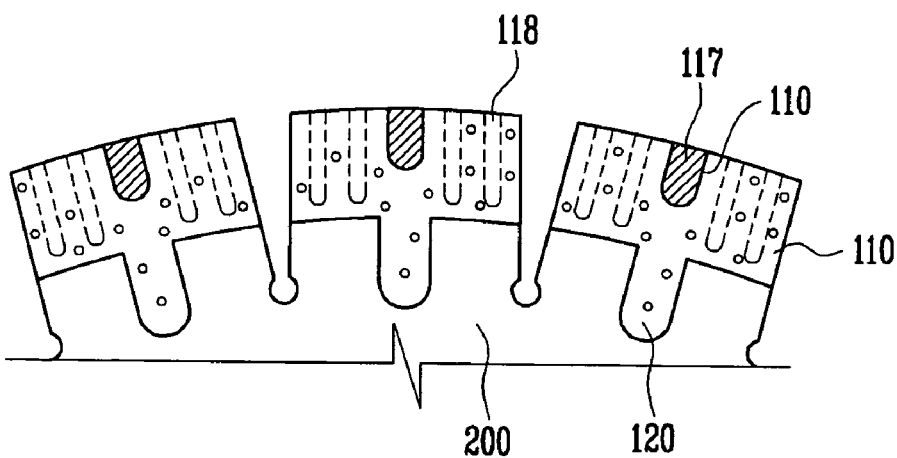
FIG. 9 illustrates a front view of a processing tip according to another embodiment of the present invention.

The processing tip 100 according to the present invention may also include at least one longitudinal hole 118, and preferably a plurality of longitudinal holes 118, as illustrated in FIG. 9. The longitudinal hole 118 may be formed to a predetermined depth with respect to the upper surface, such that the longitudinal hole 118 may extend from the upper surface of the tip body 110 towards the shank 200, i.e., the longitudinal hole 118 may be in communication with the workpiece. As a segment of the longitudinal hole 118 is abraded, a sandwich effect naturally appears, and a mesh structure is formed on the surface thereof to improve cutting ability.

The cutting tool employing the processing tips 100 according to an embodiment of the present invention may be any cutting tool having a shank 200, such as a saw blade, a gang saw, a chain saw, a frame saw, a core drill, a grinding cup wheel, a polishing disc, and so forth. The cutting tool may further include a power transmission apparatus, e.g., a rotating shaft, for rotating the shank 200. The circumference of the shank 200 of the cutting tool may further include slots, such that the processing tips 100 may be attached to the shank 200 having each slot as a border.

In accordance with another embodiment of the present invention, a method of preparing the processing tip 100 and bonding it to the shank 200 will be discussed in detail below. Accordingly, it should be noted that descriptions of the particular elements of the processing tips 100 or the shank 200 will not be repeated herein.

First, materials that compose the tip body 110, the projection 120, and the filler composition, respectively, may be mixed. In particular, a first mixture of metal powder and abrasive materials may be mixed at predetermined proportions to form at least one tip body 110, a second mixture of metal powder and abrasive materials may be mixed at predetermined proportions to form at least one projection 120, and a third mixture of filler composition may be made.

Next, the first and second mixtures may be injected into molds to form the tip body 110 and the projection 120. If a filler composition is intended to be used, a channel for the filler composition may be formed in the tip body 110 during the molding process. Any molding process known in the art may be used.

Once each part of the processing tip 100 is molded, the tip body 110 and the projection 120 may be set by placement in a carbon mold for a predetermined amount of time.

Subsequently, the carbon mold from the previous step may be transferred into a fire furnace, where specified pressure, temperature and nitrogen may be applied for a predetermined amount of time to perform sintering. In particular, the preferred sintering temperature may range from about 700° C. to about 800° C., the sintering pressure may range from about 200 Kg/cm$^2$ to about 300 Kg/cm$^2$, and the sintering flow of nitrogen gas may be about 30 Nm$^3$/hr. The predetermined amount of time may be about 1 hr.

Next, the sintered carbon molds of the tip body 110 and the projection 120 may be transferred into a cooling press for a predetermined amount of time. In particular, the preferred cooling pressure may range from about 300 Kg/cm$^2$ to about 350 Kg/cm$^2$, the flow of nitrogen gas may be about 30 Nm$^3$/hr, and the predetermined amount of time may be about 1 hr.

Once the molds are cooled, each of the tip body 110 and the projection 120 may be separated from its respective carbon mold.

Finally, the tip body 110 and the projection 120 may be welded together to form a processing tip 100. If filler composition is employed, it may be incorporated therein, i.e., the filler composition may be inserted into a channel formed in the tip body 110. The processing tip 100 may be welded into a groove of the shank 200 to form a cutting tool. Any welding process known in the art, such as high frequency welding, laser welding, oxygen torch welding, and so forth, may be employed.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A processing tip of a cutting tool, comprising:
   a tip body including a mixture of metal and abrasive material; and
   at least one projection coupled to the tip body, the at least one projection extending in a direction perpendicular to a direction of a plane of contact between the tip body and a shank,
   wherein the tip body includes at least one incising groove, and the incising groove is filled with a filler having a lower hardness than the tip body.

2. The processing tip as claimed in claim 1, wherein the projection comprises a mixture of metal and abrasive material.

3. The processing tip as claimed in claim 1, wherein the abrasive material includes particles of diamonds, silica carbide, tungsten carbide, boron nitride, aluminum oxide, or a mixture thereof.

4. The processing tip as claimed in claim 1, wherein the metal includes cobalt (Co), copper (Cu), tin (Sn), iron (Fe), zinc (Zn), nickel (Ni), or a mixture thereof.

5. The processing tip as claimed in claim 1, wherein the projection is coupled to a center of a lower surface of the tip body.

6. The processing tip as claimed in claim 1, wherein the projection is coupled to a front end of a lower surface of the tip body.

7. The processing tip as claimed in claim 1, wherein the projection is circular.

8. The processing tip as claimed in claim 1, wherein the tip body includes at least one incising groove.

9. The processing tip as claimed in claim 7, wherein the incising groove communicates with an upper surface of the tip body.

10. The processing tip as claimed in claim 7, wherein the incising groove communicates with a lower surface of the tip body.

11. The processing tip as claimed in claim 1, wherein the tip body includes at least one longitudinal hole.

12. The processing tip as claimed in claim 1, further comprising a metal member.

13. The processing tip as claimed in claim 12, wherein the metal member is coupled to a front end of the processing tip.

14. A cutting tool, comprising:
   a shank having a plurality of grooves;
   a plurality of tip bodies including a mixture of metal and abrasive material; and
   a plurality of projections, wherein each projection is coupled to one tip body and positioned in one groove.

15. The cutting tool as claimed in claim 14, wherein the shank is a disc, a plate, or a tube.

16. A method of preparing a cutting tool, comprising:
   mixing metal and abrasive material to form a first mixture;
   mixing metal and abrasive material to form a second mixture;
   injecting the first mixture into a first mold to form at least one tip body;
   injecting the second mixture into a second mold to form at least one projection;
   welding the tip body and the projection to form a processing tip; and
   welding the processing tip into a groove of a shank.

17. The method as claimed in claim 16, wherein the welding includes high frequency welding, laser welding, or oxygen torch welding.

18. The method as claimed in claim 17, wherein mixing metal and abrasive material to form the second mixture includes employing a higher concentration of abrasive materials as compared to a concentration of abrasive materials employed in the first mixture.

19. The method as claimed in claim 17, wherein welding the tip body and the projection includes attaching the projection to a front end of the tip body.

20. The method as claimed in claim 17, wherein welding the processing tip into a groove of a shank includes attaching a metal member to a front end of the processing tip.

* * * * *